(12) United States Patent
Ishikawa et al.

(10) Patent No.: US 9,040,941 B2
(45) Date of Patent: May 26, 2015

(54) CASSETTE FOR CONTAINING ACCUMULATIVE FLUORESCENT SHEET

(71) Applicant: FUJIFILM Corporation, Tokyo (JP)

(72) Inventors: Hiromi Ishikawa, Kanagawa (JP); Yasunobu Sakaguchi, Ashigarakami-gun Kanagawa (JP); Yasunori Narukawa, Kanagawa (JP); Yuzo Tanimoto, Kanagawa (JP); Kengo Nomura, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 91 days.

(21) Appl. No.: 13/865,834

(22) Filed: Apr. 18, 2013

(65) Prior Publication Data
US 2013/0277251 A1    Oct. 24, 2013

(30) Foreign Application Priority Data
Apr. 24, 2012 (JP) ................. 2012-098923

(51) Int. Cl.
*G01J 1/58* (2006.01)
*G01T 7/00* (2006.01)
*G03B 42/04* (2006.01)

(52) U.S. Cl.
CPC .. *G01T 7/00* (2013.01); *G03B 42/04* (2013.01)

(58) Field of Classification Search
CPC .................. G01T 1/2012; G03D 13/003
USPC ............................... 250/483.1, 485.1
See application file for complete search history.

(56) References Cited

U.S. PATENT DOCUMENTS

| | | | | |
|---|---|---|---|---|
| 3,607,997 A | * | 9/1971 | Linturn | 264/21 |
| 5,712,486 A | | 1/1998 | Soltani et al. | |
| 6,046,458 A | * | 4/2000 | Rantanen | 250/485.1 |

FOREIGN PATENT DOCUMENTS

EP    0100483    *  2/1984 .............. G21K 4/00

* cited by examiner

*Primary Examiner* — David Porta
*Assistant Examiner* — Edwin Gunberg
(74) *Attorney, Agent, or Firm* — McGinn IP Law Group, PLLC

(57) ABSTRACT

There is provided a cassette having: a flexible accommodating body that accommodates an accumulative fluorescent sheet in a light shielded state; an entrance/exit portion that is provided at one end portion of the flexible accommodating body, and through which the accumulative fluorescent sheet can be inserted and removed into and from the flexible accommodating body due to mounting to a radiographic image reading device; and opening/closing means for opening the flexible accommodating body such that a push-out member, that pushes the accumulative fluorescent sheet out toward the entrance/exit portion, can be inserted, or closing the flexible accommodating body in a light shielded state.

20 Claims, 17 Drawing Sheets

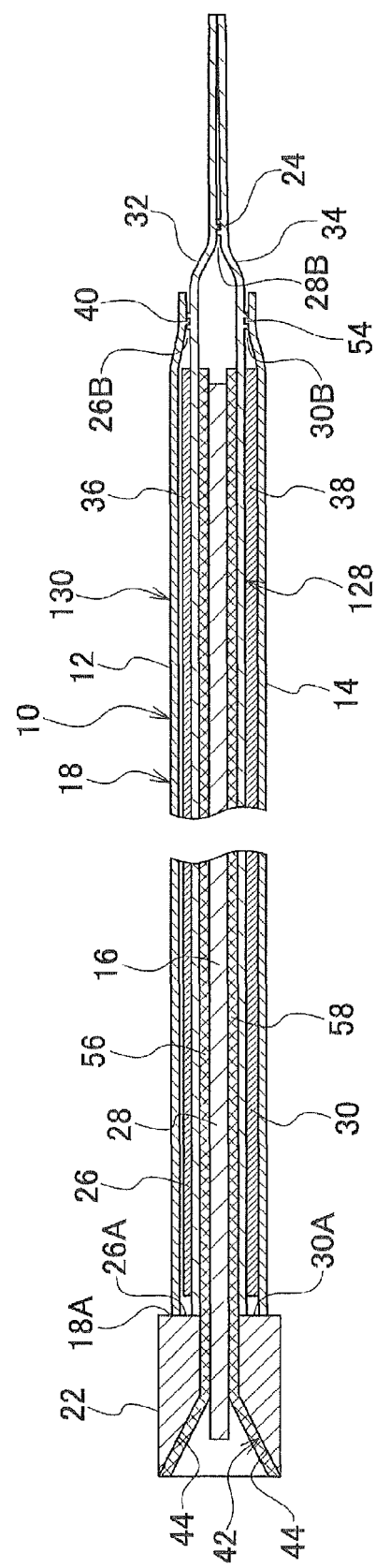

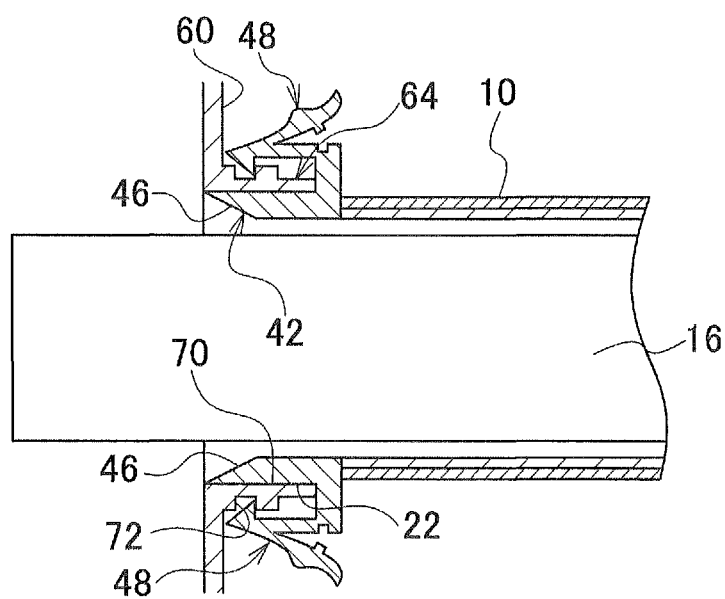

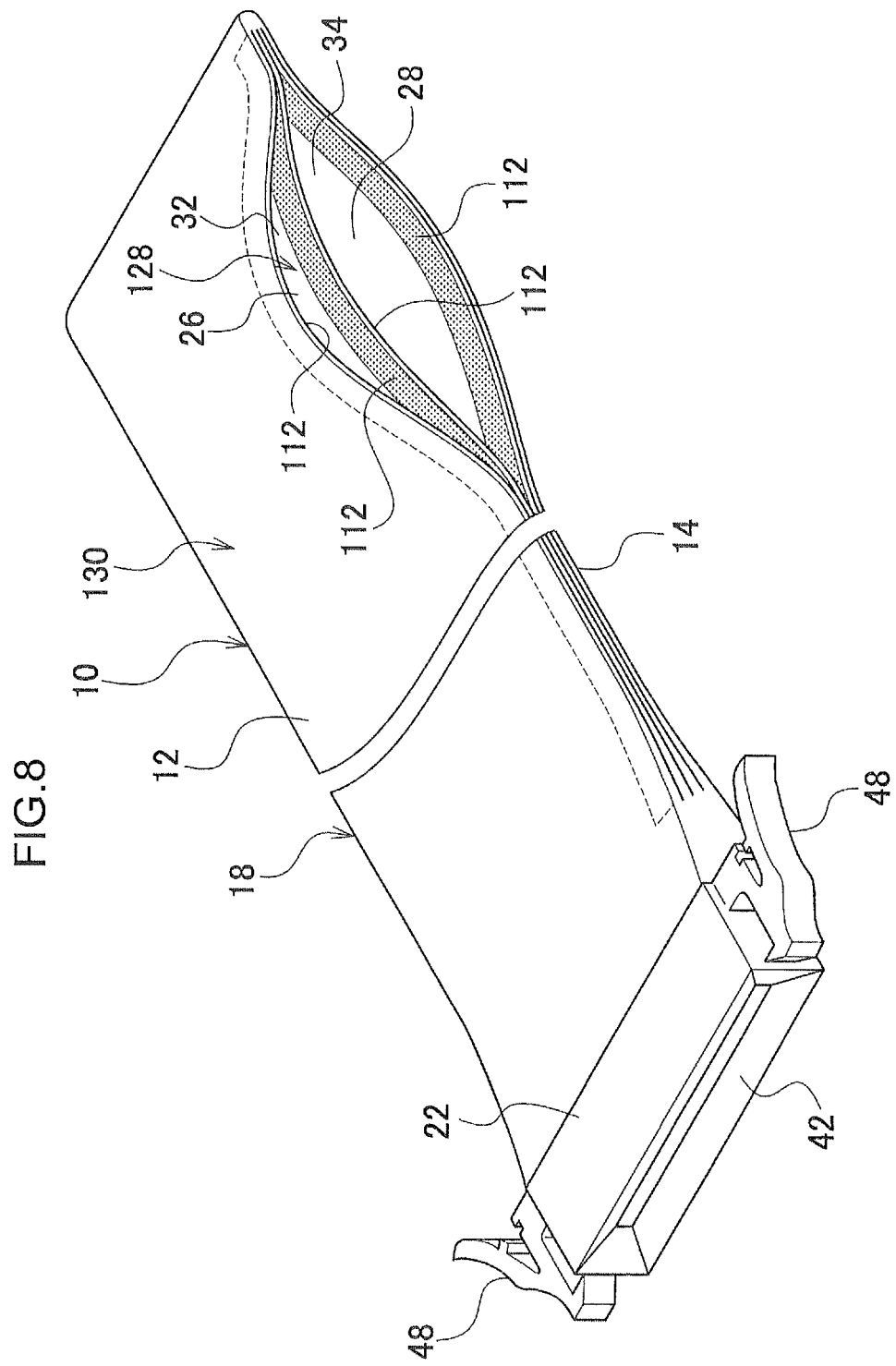

US 9,040,941 B2

CASSETTE FOR CONTAINING ACCUMULATIVE FLUORESCENT SHEET

CROSS-REFERENCE TO RELATED APPLICATION

This application is based on and claims priority under 35 USC 119 from Japanese Patent Application No. 2012-098923 filed on Apr. 24, 2012, which is incorporated by reference herein.

BACKGROUND

1. Technical Field

The present invention relates to a cassette for containing an accumulative fluorescent sheet.

2. Related Art

A cassette that is flexible is disclosed in U.S. Pat. No. 5,712,486. This cassette accommodates therein an accumulative fluorescent sheet in a state of being shielded from light. When, for example, the fitness of a welded portion of a metal pipe is inspected by carrying out radiographic imaging, the cassette is used by being wound around the welded portion of the metal pipe.

However, such a flexible cassette is a structure that is in a sealed state and that does not have opening portions other than the entrance/exit portion through which the accumulative fluorescent sheet is inserted and removed. Therefore, it is difficult to take the accumulative fluorescent sheet out to the exterior from this entrance/exit portion.

SUMMARY

In view of these circumstances, an object of the present invention is to easily take an accumulative fluorescent sheet out to the exterior from an entrance/exit portion of a cassette.

An invention relating to a first aspect of the present invention is a cassette having: a flexible accommodating body that accommodates an accumulative fluorescent sheet in a light shielded state; an entrance/exit portion that is provided at one end portion of the flexible accommodating body, and through which the accumulative fluorescent sheet can be inserted and removed into and from the flexible accommodating body due to mounting to a radiographic image reading device; and opening/closing means for opening the flexible accommodating body such that a push-out member, that pushes the accumulative fluorescent sheet out toward the entrance/exit portion, can be inserted, or closing the flexible accommodating body in a light shielded state.

BRIEF DESCRIPTION OF THE DRAWINGS

Exemplary embodiments of the present invention will be described in detail based on the following figures, wherein:

FIG. 2 is a cross-sectional view along line A-A of FIG. 1;

FIGS. 5A through 5C are plan sectional views showing a cassette mounting portion relating to the first exemplary embodiment of the present invention;

FIG. 8 is a perspective view showing a cassette relating to a third exemplary embodiment of the present invention;

DETAILED DESCRIPTION

A first exemplary embodiment of the present invention is described with reference to the drawings. First, a cassette that is the first exemplary embodiment of the present invention is described.

Figure 1:
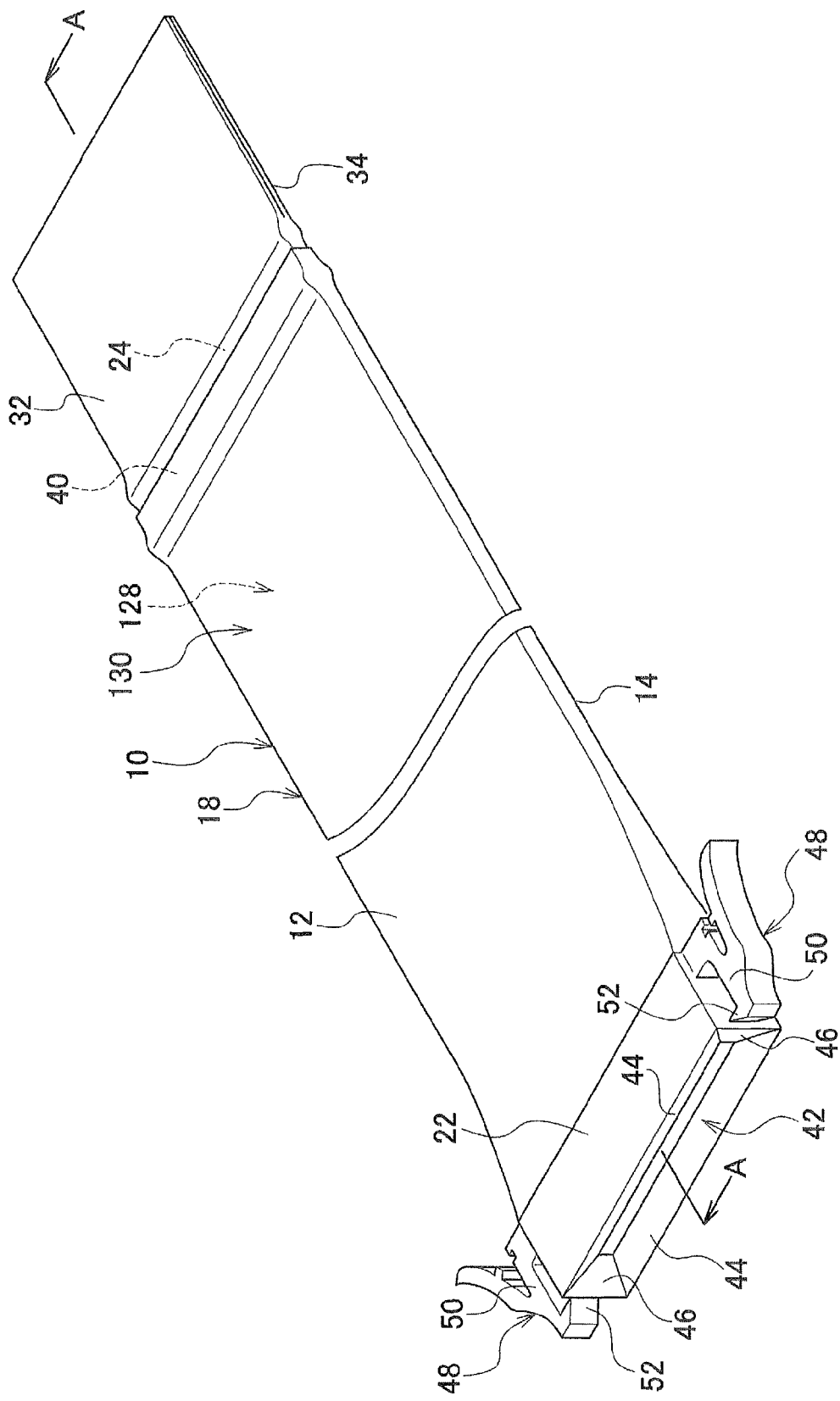
FIG. 1 is a perspective view showing a cassette relating to a first exemplary embodiment of the present invention.

As shown in the perspective view of FIG. 1 and in FIG. 2 that is a cross-sectional view along line A-A of FIG. 1 and illustrates a state in which an accumulative fluorescent sheet 16 is accommodated in a cassette 10, the cassette 10 has a flexible accommodating body 18, an engaging portion 22, and a light shielding fastener 24 that serves as an opening/closing means. The flexible accommodating body 18 is a flat container having an inner bag body 128, that is formed by the side edge portions of the front end portions and central portions of inner sheets 32, 34 that are inner skins being joined together, and an outer bag body 130, that is formed by the side edge portions of outer sheets 12, 14 that are outer skins being joined together and that covers the outer periphery of the inner bag body 128. The flexible accommodating body 18 accommodates the accumulative fluorescent sheet 16 therein in a state of being shielded from light.

As shown in FIG. 2, the flexible accommodating body 18 has an accommodating portion chamber 28 that is formed within the inner bag body 128, and accommodating portion chambers 26, 30 that are formed between the inner surfaces of the outer bag body 130 and the outer surfaces of the inner bag body 128. The accommodating portion chamber 26 is formed between the outer sheet 12 and the inner sheet 32. The accommodating portion chamber 28 is formed between the inner sheet 32 and the inner sheet 34. The accommodating portion chamber 30 is formed between the inner sheet 34 and the outer sheet 14. The accommodating portion chambers 26, 28, 30 are disposed so as to be superposed in layers in that order from top to bottom in FIG. 2.

Further, the longitudinal direction lengths of the inner sheets 32, 34 are longer than the longitudinal direction lengths of the outer sheets 12, 14. The rear end portions of the inner sheets 32, 34 are lengths that extend sufficiently toward the rear from the position of the rear end portion of the accumulative fluorescent sheet 16 that is in the state of being accommodating in the accommodating portion chamber 28.

A sensitivity enhancing sheet 36 such as lead foil or the like is removably accommodated in the accommodating portion chamber 26. The accumulative fluorescent sheet 16 is removably accommodated in the accommodating portion chamber 28. A lead sheet 38 is removably accommodated in the accommodating portion chamber 30. The lead sheet 38 has a plastic sheet and a lead layer that is formed on the top surface of this plastic sheet.

Namely, the sensitivity enhancing sheet 36 is provided so as to face the obverse of the accumulative fluorescent sheet 16 that is accommodated in the flexible accommodating body 18 (in FIG. 2, the top surface of the accumulative fluorescent sheet 16). The lead sheet 38 is provided so as to face the reverse surface (in FIG. 2, the bottom surface of the accumulative fluorescent sheet 16). Further, the sensitivity enhancing sheet 36 and the lead sheet 38 are provided so as to cover the entire accumulative fluorescent sheet 16 as seen in plan view (in FIG. 2, viewing the surface of the outer sheet 12, 14 from the outer portion side of the cassette 10).

The outer sheets 12, 14 and the inner sheets 32, 34 are formed of a plastic, such as soft vinyl chloride or the like, that is black and absorbs light and exhibits a light shielding ability. Due thereto, the flexible accommodating body 18 is flexible, and, in the state in which the flexible accommodating body 18 accommodates the accumulative fluorescent sheet 16 that is flexible, the flexible accommodating body 18 can be used by being rounded freely by being wound around an imaged subject, such as a metal pipe or the like that is the object of radiographic imaging, or by being made to follow along the inner side of an imaged subject. Note that it suffices for the outer sheets 12, 14 and the inner sheets 32, 34 to be flexible sheets that have a light shielding ability.

The engaging portion 22 is connected to a front end edge 18A of the flexible accommodating body 18, and structures an entrance/exit portion through which insertion and removal of the accumulative fluorescent sheet 16 into and from the flexible accommodating body 18 is carried out, due to the engaging portion 22 being mounted to a radiographic image reading device 20 that is described later. The engaging portion 22 is formed of a hard plastic that is harder than the outer sheets 12, 14 and the inner sheets 32, 34.

An opening portion 42, that serves as an opening portion that structures a through-hole that has a rectangular cross-section and that communicates with the accommodating portion chamber 28 and through which the accumulative fluorescent sheet 16 is inserted and removed, is fowled in the engaging portion 22. Namely, the engaging portion 22 is formed so as to surround the periphery of the opening portion 42. Tapered surfaces 44, 46, that become wider toward the outer side, are formed at each of the top, bottom, left and right surfaces of the front end portion side of the opening portion 42 when the cassette 10 is disposed such that the top and bottom surfaces thereof are substantially horizontal (refer to FIG. 1). As shown in FIG. 2, the accumulative fluorescent sheet 16 is accommodated in the accommodating portion chamber 28 by being inserted in from the opening portion 42 of the engaging portion 22.

Further, as shown in FIG. 1, claw members 48, that maintain the engaged state of the engaging portion 22 that is mounted to the radiographic image reading device 20, are provided at the left and right side surfaces of the engaging portion 22. The claw member 48 has an aim portion 50 that is elastic, and a claw portion 52 that is formed at the distal end of the arm portion 50 and is pointed toward the inner side.

Figure 3A:
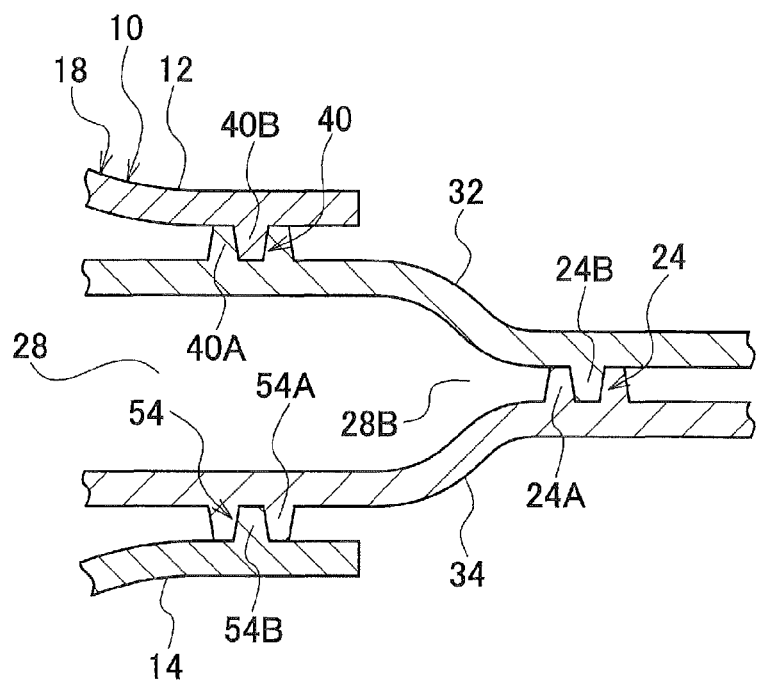
FIGS. 3A and 3B are side sectional views showing a light shielding fastener relating to the first exemplary embodiment of the present invention.
Figure 3B:
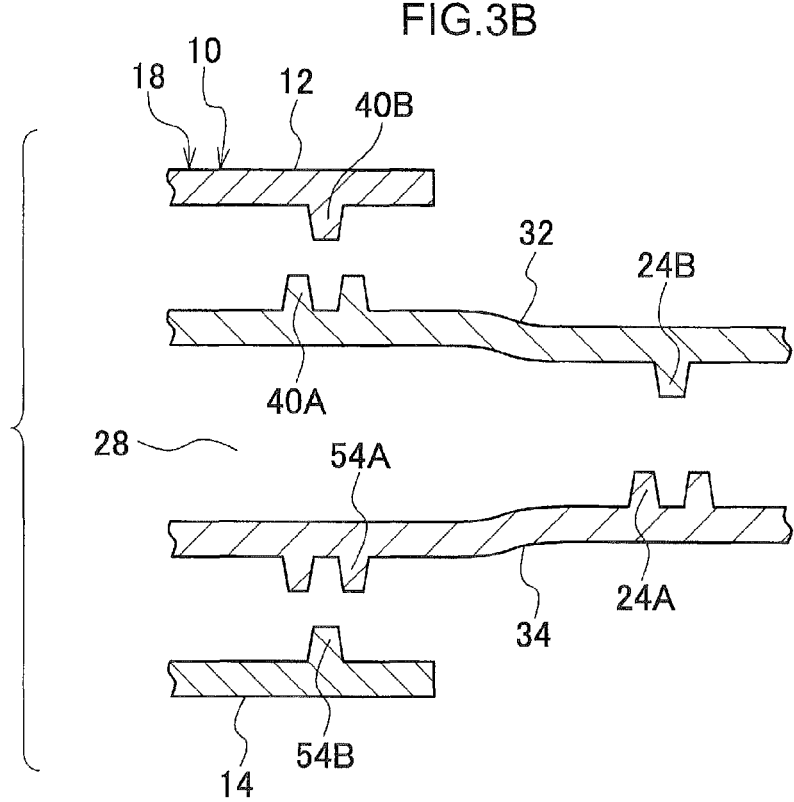

As shown in the side sectional views of FIGS. 3A and 3B, the light shielding fastener 24 that opens and closes the accommodating portion chamber 28 is provided in a vicinity of a rear end edge 28B of the accommodating portion chamber 28. The light shielding fastener 24 is structured by a concave member 24A, that is made of plastic and is provided at the inner surface of the inner sheet 34, and a convex member 24B, that is made of plastic and is provided at the inner surface of the inner sheet 32. As shown in FIG. 3A, due to the projecting portion of the convex member 24B being fit-together with the groove portion of the concave member 24A, the light shielding fastener 24 is closed and the light shielded state of the interior of the accommodating portion chamber 28 is ensured. Moreover, as shown in FIG. 3B, the light shielding fastener 24 is opened due to the projecting portion of the convex member 24B being removed from the groove portion of the concave member 24A.

Namely, the light shielding fastener 24 is provided at the other end portion (the rear end portion) of the flexible accommodating body 18 that is positioned at the side opposite the engaging portion 22. The light shielding fastener 24 structures an opening/closing means that opens and closes the flexible accommodating body 18 (the accommodating portion chamber 28). By opening the light shielding fastener 24, a push-out member (hereinafter called "push-out member"), such as the finger of a person or a push-out tool or the like that pushes the accumulative fluorescent sheet 16 out toward the engaging portion 22, can be inserted in from the opened opening. By closing the light shielding fastener 24, the light shielded state of the interior of the flexible accommodating body 18 (the accommodating portion chamber 28) is ensured.

As shown in FIG. 2, a front end edge 26A of the accommodating portion chamber 26 is closed by the engaging portion 22, and a light shielding fastener 40 that opens and closes the accommodating portion chamber 26 is provided in a vicinity of a rear end edge 26B of the accommodating portion chamber 26. As shown in FIG. 3A and FIG. 3B, the light shielding fastener 40 is similar to the light shielding fastener 24, and is structured by a concave member 40A, that is made of plastic and is provided at the outer surface of the inner sheet 32, and a convex member 40B, that is made of plastic and is provided at the inner surface of the outer sheet 12. The insertion and removal of the sensitivity enhancing sheet 36 is carried out through the opened opening of the light shielding fastener 40 that has been opened. Further, by closing the light shielding fastener 40, the light shielded state of the interior of the accommodating portion chamber 26 is ensured.

As shown in FIG. 2, a front end edge 30A of the accommodating portion chamber 30 is closed by the engaging portion 22, and a light shielding fastener 54 that opens and closes the accommodating portion chamber 30 is provided in a vicinity of a rear end edge 30B of the accommodating portion chamber 30. As shown in FIG. 3A and FIG. 3B, the light shielding fastener 54 is similar to the light shielding fastener 24, and is structured by a concave member 54A, that is made of plastic and is provided at the outer surface of the inner sheet 34, and a convex member 54B, that is made of plastic and is provided at the inner surface of the outer sheet 14. The insertion and removal of the lead sheet 38 is carried out through the opened opening of the light shielding fastener 54 that has been opened. Further, by closing the light shielding fastener 54, the light shielded state of the interior of the accommodating portion chamber 30 is ensured.

As shown in FIG. 2, non-woven cloths 56, 58 are provided at the inner surfaces of the inner sheets 32, 34. Due thereto, the obverse of the accumulative fluorescent sheet 16 that is accommodated in the flexible accommodating body 18 (the top surface of the accumulative fluorescent sheet 16 in FIG. 2) is covered by the non-woven cloth 56, and the reverse surface (the bottom surface of the accumulative fluorescent sheet 16 in FIG. 2) is covered by the non-woven cloth 58.

The accumulative fluorescent sheet 16 is a sheet that is flexible and is used in radiographic imaging, and is structured by a supporting plate that is made of plastic, and a fluorescent layer that is formed on the top surface of this supporting plate and at which photostimulated luminescence occurs. (In FIG. 2, the obverse (top surface) of the accumulative fluorescent sheet 16 is the fluorescent layer.)

For example, when radiation (X-rays, α-rays, β-rays, γ-rays, an electron beam, ultraviolet light, or the like) that has passed through an imaged subject that is the object of radiographic imaging is irradiated onto the fluorescent layer of the accumulative fluorescent sheet 16, the radiation energy thereof is accumulated in the fluorescent layer. Then, by illuminating excitation light, such as visible light or laser light or the like, onto the fluorescent layer at which the radiation energy is accumulated, light of a strength that corresponds to the accumulated energy strength is emitted as photostimulated luminescence light.

By using these principles, the radiographic image reading device 20 that is described later once records, on the accumulative fluorescent sheet 16, radiographic image information that has been transmitted through the imaged subject, and optically reads the photostimulated luminescence light, that is obtained from the accumulative fluorescent sheet 16, and converts the photostimulated luminescence light into image signals, and, on the basis of the image signals, makes visible and reproduces radiographic images on a recording material such as a photographic photosensitive material or the like, or a display device such as a CRT or the like.

The light that is the object of blocking by the flexible accommodating body 18 is light that, by being illuminated, causes the radiation energy accumulated in the fluorescent layer of the accumulative fluorescent sheet 16 to vanish. Namely, this is light of a portion of a wavelength region other than the wavelength region of the radiation that is irradiated onto the fluorescent layer of the accumulative fluorescent sheet 16 at the time of radiographic imaging. For example, visible light and UV light and the like, such as illumination light and sunlight and the like that normally occur indoors and outdoors, correspond to this light.

Figure 4:
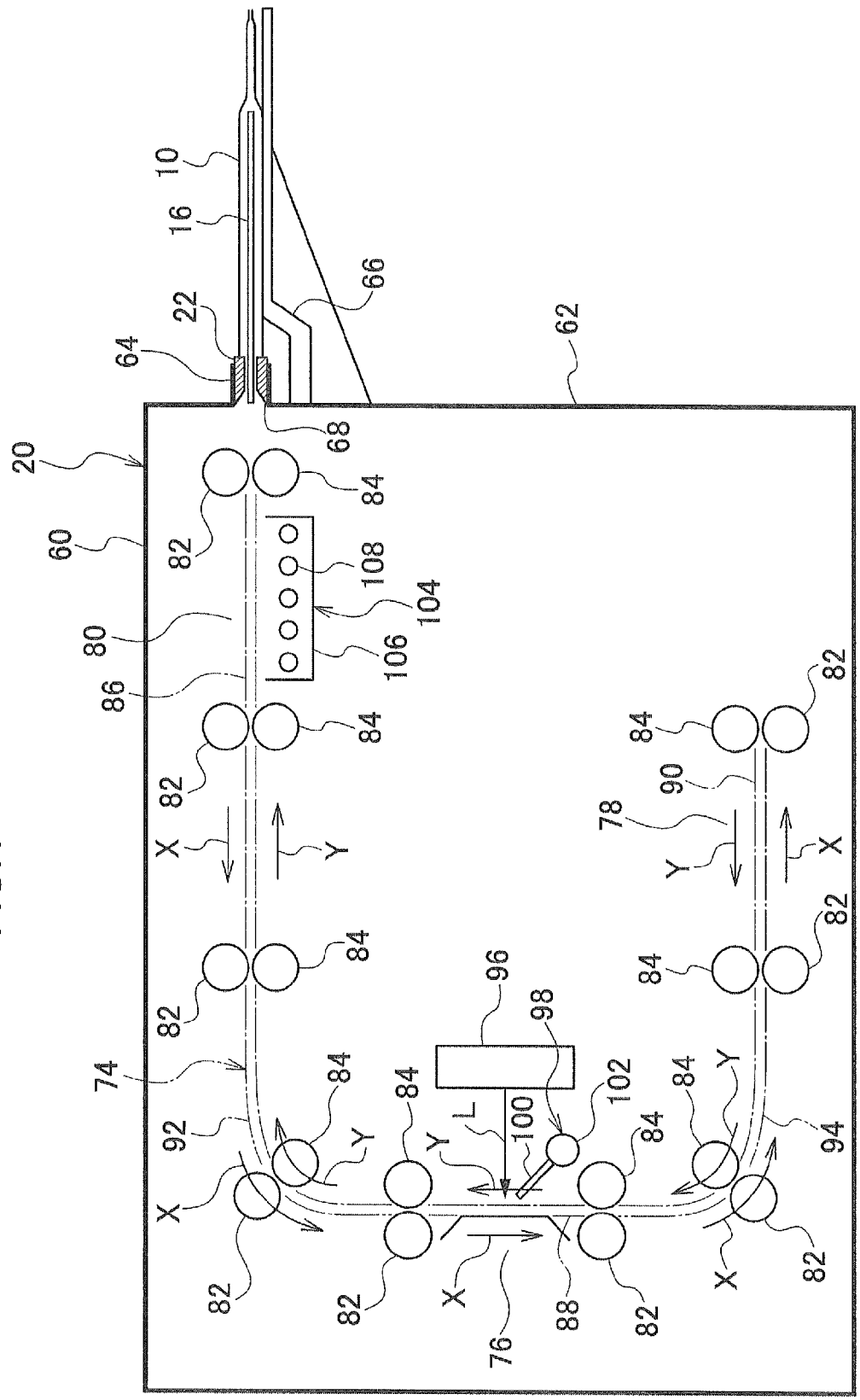
FIG. 4 is an overall view showing a radiographic image reading device relating to a first exemplary embodiment of the present invention.

An overall view of the radiographic image reading device 20 is shown in FIG. 4. A cassette mounting portion 64, to and from which the cassette 10 is mounted and removed, is provided at the upper portion of a side wall surface 62 at the right side of a housing 60 that structures the radiographic image reading device 20. A light shielded state of the same extent as that of the interior of the cassette 10 is ensured at the interior of the housing 60. A supporting stand 66, on which the cassette 10, that is mounted to the cassette mounting portion 64, is placed substantially horizontally, is provided beneath the cassette mounting portion 64.

Figure 5A:
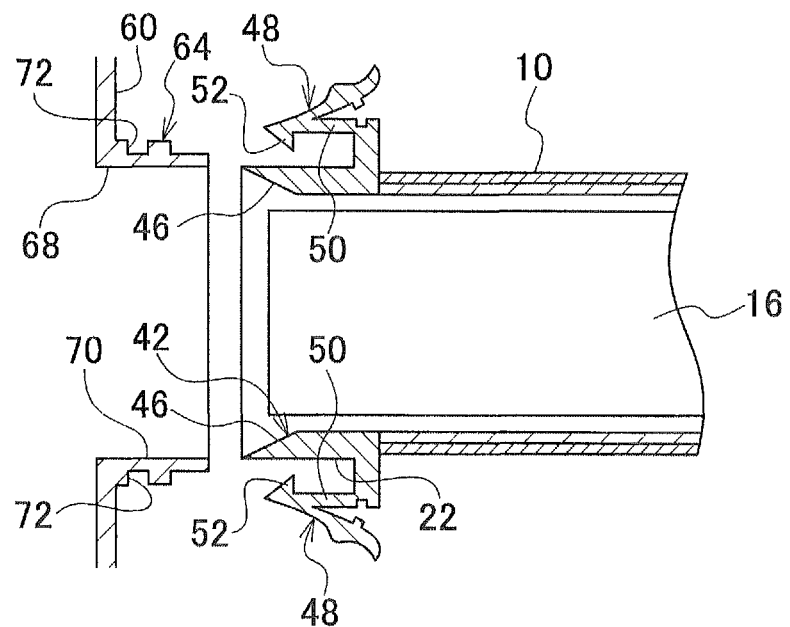

As shown by the plan sectional view of FIG. 5A in which a vicinity of the cassette mounting portion 64 is enlarged, the cassette mounting portion 64 is structured by an engaged portion 70 that engages with the engaging portion 22 of the cassette 10 and that is provided so as to project-out from the outer peripheral portion of an insertion opening 68 into which the accumulative fluorescent sheet 16, that has been pulled-out from the cassette 10, is fed.

Figure 5B:
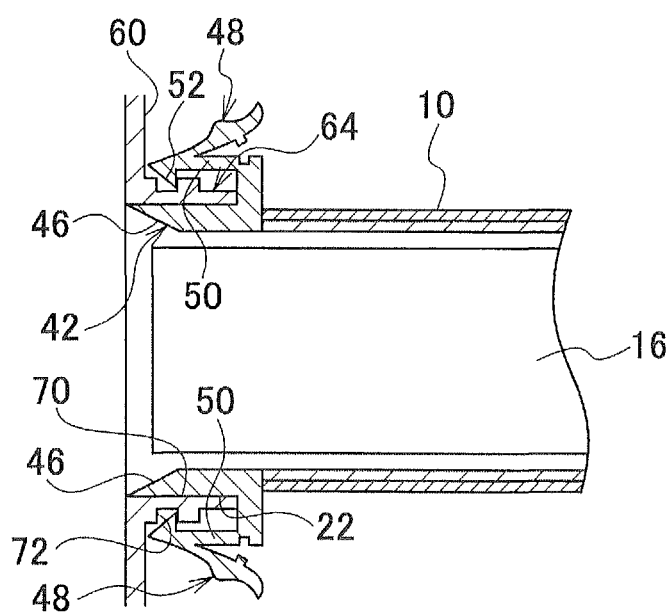

As shown in FIG. 5B, by inserting and engaging the engaging portion 22 of the cassette 10 with the engaged portion 70 of the cassette mounting portion 64, the claw portions 52 enter into concave portions 72, that are provided at the left and right side surfaces of the engaged portion 70, due to the elastic forces of the arm portions 50 of the claw portions 48. Due thereto, the engaged state of the engaging portion 22 that is engaged with the engaged portion 70 is maintained, and the engaging portion 22 can be prevented from coming-out from the cassette mounting portion 64. Further, because the engaging portion 22 is formed of a hard plastic, the engaging portion 22 can be reliably engaged with the engaged portion 70.

As shown in FIG. 4, a sheet conveying path 74, an image reading area 76, a sheet withdrawing area 78, and an image erasing area 80 are provided at the interior of the housing 60. The sheet conveying path 74 is a substantially U-shaped path that is formed from three rectilinear paths 86, 88, 90 and two curved paths 92, 94, at which are disposed plural pairs of conveying rollers 82, 84 that convey the accumulative fluorescent sheet 16 by nipping the accumulative fluorescent sheet 16 therebetween and rotating forward or rotating reversely.

The rectilinear paths 86, 88, 90 are disposed in that order from the upstream side toward the downstream side with respect to direction X that heads from the insertion opening 68 toward the sheet withdrawing area 78. Further, the curved path 92 is disposed so as to connect the rectilinear path 86 and the rectilinear path 88, and the curved path 94 is disposed so as to connect the rectilinear path 88 and the rectilinear path 90. Note that, in the first exemplary embodiment, forward rotation of the conveying rollers 82 shown in FIG. 4 is clockwise rotation, forward rotation of the conveying rollers 84 is counterclockwise rotation, reverse rotation of the conveying rollers 82 is counterclockwise rotation, and reverse rotation of the conveying rollers 84 is clockwise rotation.

The image reading area 76 is disposed at an intermediate position of the rectilinear path 88. An excitation light scanning unit 96 and an image reading unit 98 are disposed at the image reading area 76.

At the excitation light scanning unit 96, excitation light L that is outputted from a laser light source is deflected in a main scanning direction (the surface direction of the accumulative fluorescent sheet 16 that is orthogonal to direction X) by a polygon mirror or the like, and is illuminated onto and scans the fluorescent layer of the accumulative fluorescent sheet 16 that moves in a subscanning direction (direction X) by the conveying rollers 82, 84.

At the image reading unit 98, the photostimulated luminescence light, that is emitted from the fluorescent layer of the accumulative fluorescent sheet 16 onto which the excitation light L has been illuminated, is led, via a light collecting guide 100, into a photoelectric converter 102, and is converted into electric signals.

The withdrawing area 78 is disposed at the final point position of the going path along which the accumulative fluorescent sheet 16 is conveyed in direction X by the conveying rollers 82, 84.

The image erasing area 80 is disposed at the final point position of the return path along which the accumulative fluorescent sheet 16 is conveyed in direction Y, that is the direction opposite direction X, by the conveying rollers 82, 84. An image erasing unit 104 is disposed at the image erasing area 80.

The image erasing unit 104 is structured by a case 106 whose surface at the rectilinear path 86 side is open, and plural erasure light sources 108 that are formed from cold cathode fluorescent tubes or the like and that are disposed within this case 106.

In a method of reading the radiographic images of the accumulative fluorescent sheet 16 by the radiographic image reading device 20, first, as shown in FIG. 4 and FIG. 5A, the cassette 10 is placed on the supporting stand 66 so as to be oriented such that the fluorescent layer (the obverse) of the accumulative fluorescent sheet 16, on which radiographic image information of the imaged subject has been recorded by radiographic imaging, becomes the bottom surface.

Next, as shown in FIG. 5B, the engaging portion 22 of the cassette 10 is engaged with the engaged portion 70 of the cassette mounting portion 64, and the cassette 10 is mounted to the cassette mounting portion 64.

Figure 6A:
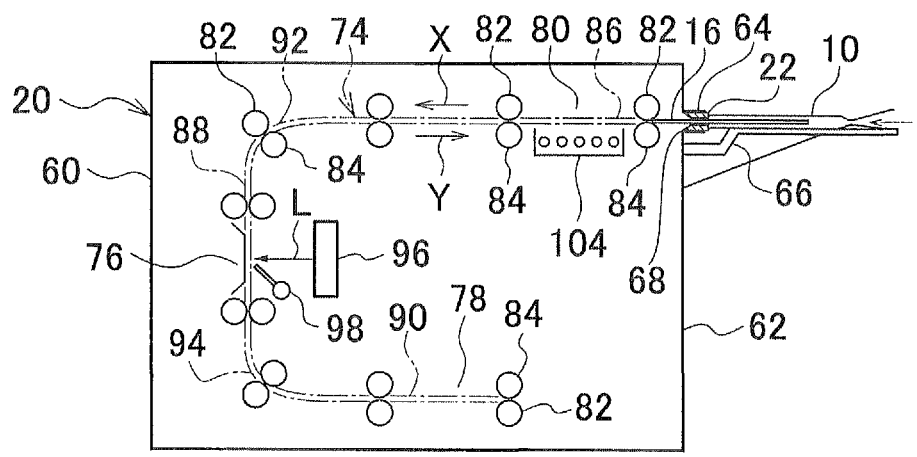
FIGS. 6A through 6D are overall view showing the radiographic image reading device relating to the first exemplary embodiment of the present invention.

Next, as shown in FIG. 3B, a push-out member is inserted from the opened opening of the light shielding fastener 24 of the cassette 10. As shown in FIG. 5C, the accumulative fluorescent sheet 16 is pushed-out toward the opening portion 42 of the engaging portion 22 by this push-out member. Due thereto, as shown in FIG. 6A, the leading end portion of the accumulative fluorescent sheet 16 projects-out to the exterior of the cassette 10, and is fed-in to the conveying rollers 82, 84 that are provided in a vicinity of the insertion opening 68. Then, after the accumulative fluorescent sheet 16 is pushed-out into the opening portion 42 of the engaging portion 22, the light shielding fastener 24 is closed.

Figure 6B:
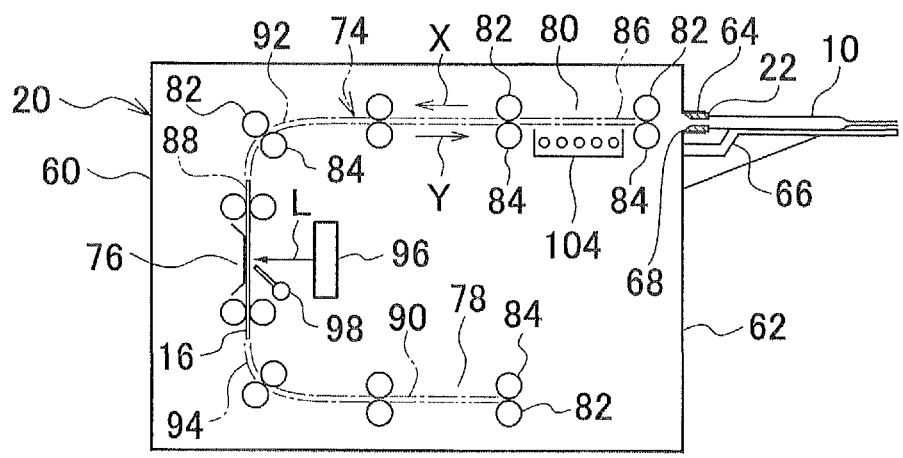

Next, as shown in FIG. 6B, the accumulative fluorescent sheet 16 is conveyed along the going path in direction X in the order of the rectilinear path 86, the curved path 92, and the rectilinear path 88 by the conveying rollers 82, 84 that rotate forward, and reaches the image reading area 76. At the image reading area 76, scanning of the excitation light L onto the fluorescent layer of the accumulative fluorescent sheet 16 is carried out by the excitation light scanning unit 96, and the photostimulated luminescence light, that is emitted from the fluorescent layer of the accumulative fluorescent sheet 16 onto which the excitation light L has been illuminated, is converted into electric signals by the image reading unit 98. Then, the electric signals are sent as radiographic image information to an image information processing device at the exterior.

Figure 6C:
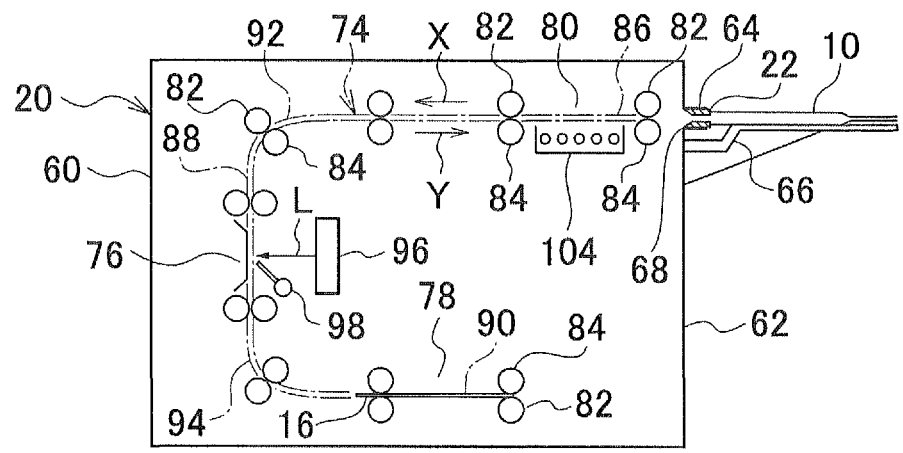

Next, as shown in FIG. 6C, the accumulative fluorescent sheet 16 that has passed through the image reading area 76 is conveyed along the going path in direction X in the order of the curved path 94 and the rectilinear path 90 by the conveying rollers 82, 84 that rotate forward, and reaches the withdrawing area 78.

Figure 6D:
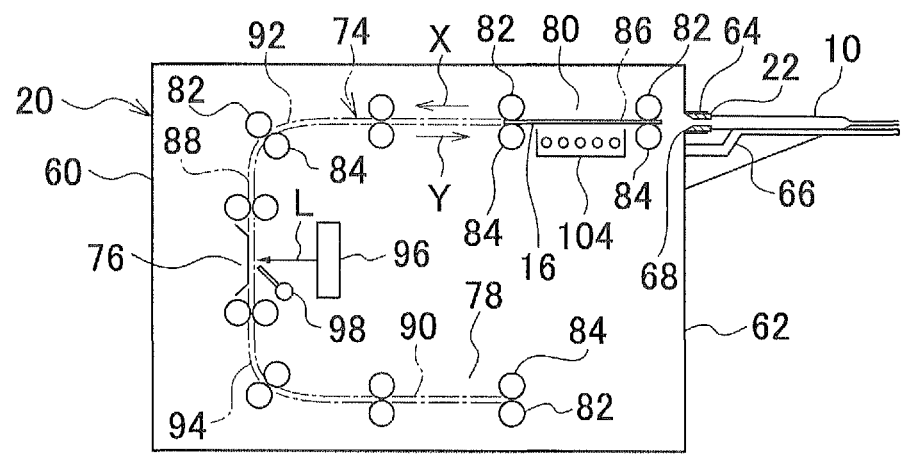

Next, as shown in FIG. 6D, the accumulative fluorescent sheet 16 that has reached to the withdrawing area 78 is conveyed along the return path in direction Y in the order of the rectilinear path 90, the curved path 94, the rectilinear path 88, the curved path 92 and the rectilinear path 86 by the conveying rollers 82, 84 that rotate reversely, and reaches the image erasing area 80. At the image erasing area 80, by the image erasing unit 104, erasure light that is emitted from the plural erasure light sources 108 is illuminated onto the fluorescent layer of the accumulative fluorescent sheet 16, and the radiation energy that remains at the accumulative fluorescent sheet 16 is erased.

Next, the accumulative fluorescent sheet 16 that has passed through the image erasing area 80 is sent-in toward the opening portion 42 of the engaging portion 22 via the insertion opening 68 by the conveying rollers 82, 84 that rotate reversely, and a portion of the accumulative fluorescent sheet 16 is accommodated within the cassette 10 (the accommodating portion chamber 28).

Next, a pull-out member (hereinafter called "pull-out member"), such as the finger of a person or a pull-in tool or the like, is inserted-in from the opened opening of the light shielding fastener 24 of the cassette 10, and the accumulative fluorescent sheet 16 is pulled into the interior of the cassette 10 (the accommodating portion chamber 28) by this pull-out member, and is completely accommodated therein.

Finally, after the light shielding fastener 24 of the cassette 10 is closed, the cassette 10 is removed from the cassette mounting portion 64.

Operation and effects of the cassette of the first exemplary embodiment of the present invention are described next.

The radiation energy, that is accumulated in the accumulative fluorescent sheet by radiographic imaging, vanishes due to the accumulative fluorescent sheet being exposed. Therefore, the accumulative fluorescent sheet must be kept in a state of being shielded from light until the radiographic images that are recorded on the accumulative fluorescent sheet are read by a radiographic image reading device. Thus, a conventional flexible cassette that accommodates an accumulative fluorescent sheet is a structure in a sealed state that does not have an opening portion other than the entrance/exit portion for the accumulative fluorescent sheet. Due thereto, it is difficult to take the accumulative fluorescent sheet out from this entrance/exit portion.

Taking an accumulative fluorescent sheet out from a cassette is difficult in particular in a cassette that accommodates an accumulative fluorescent sheet in a state of contacting the inner wall surface of the flexible accommodating body that accommodates the accumulative fluorescent sheet.

In contrast, at the cassette 10 of the first exemplary embodiment, the light shielding fastener 24, that is provided at the other end portion (the rear end portion) of the flexible accommodating body 18, is opened, and a push-out member is inserted in from the opened opening, and the accumulative fluorescent sheet 16 is pushed-out toward the opening portion 42 of the engaging portion 22 by this push-out member. Due thereto, the accumulative fluorescent sheet 16 can be sent-out from the interior of the cassette 10 toward the exterior of the cassette 10 (toward the interior of the radiographic image reading device 20).

Further, the pull-out member is inserted in from the opened opening of the light shielding fastener 24 that is provided at the other end portion the rear end portion) of the flexible accommodating body 18, and the accumulative fluorescent sheet 16, that has been inserted-in from the exterior of the cassette 10 toward the opening portion 42 of the engaging portion 22, can be pulled into the interior of the accommodating portion chamber 28 of the flexible accommodating body 18 by this pull-out member, and can be completely accommodated therein. Namely, the accumulative fluorescent sheet 16 can be easily taken-out from the engaging portion 22 (the opening portion 42) of the cassette 10 to the exterior, and the accumulative fluorescent sheet 16 can be easily inserted into the interior of the cassette 10.

In a case of carrying out radiographic imaging in a state in which the flexible cassette, that accommodates the accumulative fluorescent sheet, is rounded by being wound around an imaged subject such as a pipe or the like or by being made to follow along the inner side, it can be thought that curls will form at the accumulative fluorescent sheet and that the accumulative fluorescent sheet will curl.

One reason why curls form at the accumulative fluorescent sheet is thought to be that the accumulative fluorescent sheet is a member having a two-layer structure that is structured by the supporting plate and the fluorescent layer that is formed on the top surface of this supporting plate. The supporting plate is formed of plastic, and the fluorescent layer is formed by accumulative fluorescent particles and a binder. Further, because the supporting plate and the binder both are high polymer materials, they have both the properties of elasticity and viscosity (plasticity). Accordingly, when the accumulative fluorescent sheet is rounded, more tension arises at the outer side of the accumulative fluorescent sheet than the inner side, and the outer side extends longer. Even after the tension is released, due to the viscosity (plasticity), the outer side does not return to its original length. Due thereto, the lengths of the outer side and the inner side of the accumulative fluorescent sheet differ, and curls are formed thereat.

When curls are formed at the accumulative fluorescent sheet and the accumulative fluorescent sheet curls in this way, insertion and removal of the accumulative fluorescent sheet into and from the flexible cassette becomes even more difficult. However, in the cassette 10 of the first exemplary embodiment, even if the accumulative fluorescent sheet curls, insertion and removal of the accumulative fluorescent sheet 16 into and from the engaging portion 22 (the opening portion 42) of the cassette 10 can be carried out easily by the push-out member or the pull-out member that is inserted in from the opened opening of the light shielding fastener 24 that has been opened.

Moreover, in the first exemplary embodiment, by closing the light shielding fastener 24 that is provided at the other end portion (the rear end portion) of the flexible accommodating body 18, the interior of the accommodating portion chamber 28 of the flexible accommodating body 18 can be set in a state of being shielded from light. Due thereto, the accumulative fluorescent sheet 16 on which radiographic images are recorded being exposed and the radiation energy accumulated at the accumulative fluorescent sheet 16 disappearing can be prevented.

Further, in the first exemplary embodiment, the light shielding fastener 24 that is provided at the other end portion (the rear end portion) of the flexible accommodating body 18 can be opened, and the interior of the accommodating portion chamber 28 of the flexible accommodating body 18 can be cleaned efficiently. Due thereto, foreign matter within the accommodating portion chamber 28 of the flexible accommodating body 18 can be removed, and therefore, the fluorescent layer of the accumulative fluorescent sheet 16 that is accommodated in the cassette 10 can be prevented from being damaged by foreign matter. If the fluorescent layer of the accumulative fluorescent sheet 16 is damaged, there are cases in which predetermined radiographic images cannot be obtained.

Moreover, the light shielding fastener 24 is provided at the other end portion (the rear end portion) of the flexible accommodating body 18 that is positioned at the side opposite the engaging portion 22 (the opening portion 42). Therefore, the push-out member can be inserted in from the opened opening of the light shielding fastener 24, and the accumulative fluorescent sheet 16 can be pushed-out straight toward the opening portion 42 by this push-out member. Further, the pull-out member can be inserted in from the opened opening of the light shielding fastener 24, and the accumulative fluorescent sheet 16, that has been inserted into the opening portion 42 of the engaging portion 22 from the exterior of the cassette 10, can be pulled straight into the accommodating portion chamber 28 of the flexible accommodating body 18 by this pull-out member. Due thereto, insertion and removal of the accumulative fluorescent sheet 16 into and from the engaging portion 22 (the opening portion 42) of the cassette 10 can be carried out more easily.

Further, in the first exemplary embodiment, by structuring the opening/closing means by the light shielding fastener 24, the accommodating portion chamber 28 of the flexible accommodating body 18 can be closed reliably.

Moreover, in the first exemplary embodiment, the tapered surfaces 44, 46, that widen toward the outer side, are formed at the opening portion 42 at the front end portion side of the engaging portion 22. Therefore, the accumulative fluorescent sheet 16 can be easily inserted into the accommodating portion chamber 28 of the flexible accommodating body 18 from the opening portion 42 of the engaging portion 22.

Further, in the first exemplary embodiment, owing to the lead plate 38 that is disposed at the reverse surface side of the accumulative fluorescent sheet 16, the radiation, that has passed through the accumulative fluorescent sheet 16 at the time of radiographic imaging, is prevented from being reflected and being irradiated again onto the accumulative fluorescent sheet 16. Due thereto, the quality of the radiographic images formed at the fluorescent layer of the accumulative fluorescent sheet 16 can be improved. Moreover, owing to the sensitivity enhancing sheet 36 that is disposed at the obverse side of the accumulative fluorescent sheet 16, the sensitivity to the radiation, that passes through the sensitivity enhancing sheet 36 and is irradiated onto the accumulative fluorescent sheet 16, can be enhanced.

Further, in the first exemplary embodiment, the lead sheet 38 is structured by a plastic sheet and a lead layer that is formed on this plastic sheet. Therefore, when the lead sheet 38 is bent, it is difficult for wrinkles to form in the lead layer. Due thereto, the effect of improving the quality of the radiographic images due to the lead sheet 38 can be exhibited uniformly over the entire surface of the lead sheet 38.

Moreover, in the first exemplary embodiment, the rear end portions of the inner sheets 32, 34 are lengths that extend sufficiently toward the rear from the position of the rear end portion of the accumulative fluorescent sheet 16 that is a state of being accommodated within the accommodating portion chamber 28. Therefore, when a push-out member is inserted in from the opened opening of the light shielding fastener 24 that is provided at the other end portion (the rear end portion) of the flexible accommodating body 18, the periphery of the push-out member is covered by the end portions of the inner sheets 32, 34 that extend rearward from the light shielding fastener 24, and therefore, the amount of light that is incident from the opened opening of the light shielding fastener 24 can be reduced.

Further, in the first exemplary embodiment, by accommodating the accumulative fluorescent sheet 16, the lead sheet 38 and the sensitivity enhancing layer 36 in the respectively separate accommodating portion chambers 26, 28, 30, the accumulative fluorescent sheet 16 and the lead sheet 38, or the accumulative fluorescent sheet 16 and the sensitivity enhancing layer 36, rubbing against one another and the obverse (the fluorescent layer) or the reverse surface of the accumulative fluorescent sheet 16 being damaged can be prevented.

Moreover, by protecting the accumulative fluorescent sheet 16 by the non-woven cloths 56, 58, the obverse (the fluorescent layer) and the reverse surface of the accumulative fluorescent sheet 16 being damaged can be prevented. In particular, because fine damage on the order of 100 microns can be prevented from being formed at the fluorescent layer of the accumulative fluorescent sheet 16, fine defects on the order of 100 microns that the imaged subject has can be detected.

Note that, in the first exemplary embodiment, as shown in FIG. 2, the opening portion 42 of the engaging portion 22 is always in an opened state. However, if the region in the vicinity of the front end portion of the accumulative fluorescent sheet 16 is not used as a recording region of radiographic image information in the radiographic imaging, there is no problem even if some light is incident from the opening portion 42 (light of an amount to the extent that the radiation energy accumulated at the region other than the vicinity of the front end portion of the accumulative fluorescent sheet 16 does not vanish and it does not become impossible to read the radiographic images).

Figure 7A:
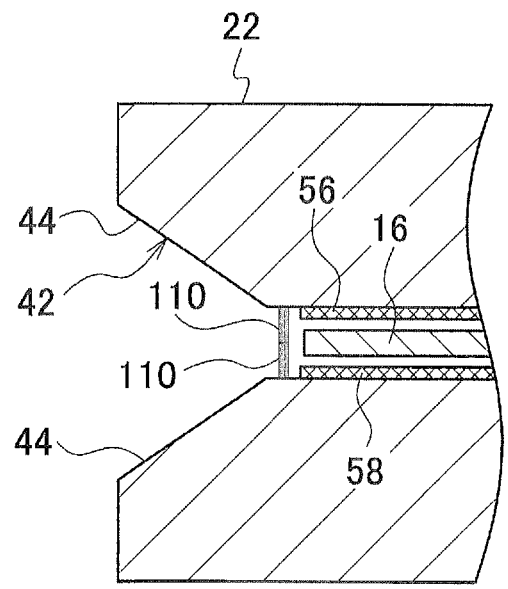
FIGS. 7A and 7B are side sectional views showing an engaging portion relating to a second exemplary embodiment of the present invention.
Figure 7B:
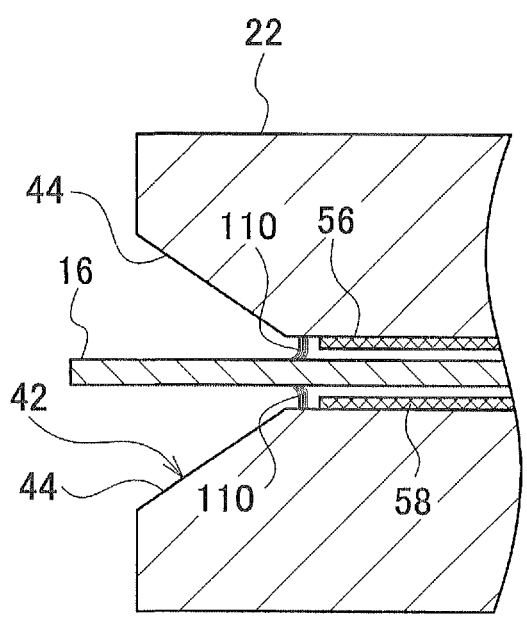

For example, as in a second exemplary embodiment that is shown in FIGS. 7A and 7B that are side sectional views of the engaging portion 22, if a napped flexible member 110 or sponge or the like is provided at the opening portion 42 as a light shielding wall through which the accumulative fluorescent sheet 16 can be inserted and removed, the region in the vicinity of the front end portion of the accumulative fluorescent sheet 16 can be used as a recording region of radiographic image information in the radiographic imaging. Note that a state before the accumulative fluorescent sheet 16 is pushed-out from the opening portion 42 is shown in FIG. 7A, and a state in which the accumulative fluorescent sheet 16 is being pushed-out from the opening portion 42 is shown in FIG. 7B.

Further, as shown in FIG. 2, the first exemplary embodiment illustrates an example in which the light shielding fastener 24 that serves as the opening/closing means is provided at the rear end edge 28B of the accommodating portion chamber 28. However, the opening/closing means may be provided at another region of the accommodating portion chamber 28. For example, as in a third exemplary embodiment that is shown in a perspective view in FIG. 8, Velcro (registered trademark) 112 serving as an opening/closing means may be provided at the side edge portion of the accommodating portion chamber 28. By doing so, the accommodating portion chamber 28 can be opened wide, and therefore, the interior of the accommodating portion chamber 28 can be cleaned more efficiently. In FIG. 8, the side edge portions of the accommodating portion chambers 26, 30 also can be opened and closed by the Velcro (registered trademark) 112.

Moreover, as shown in FIG. 2, the first exemplary embodiment illustrates an example in which the opening/closing means is made to be the light shielding fasteners 24, 40, 54. However, it suffices for the opening/closing means to be a structure that, when closed, can ensure the light shielded states of the interiors of the accommodating portion chambers 26, 28, 30, and the opening/closing means may be structured by using, for example, Velcro (registered trademark), magnets, clips, or the like.

Further, although the first exemplary embodiment illustrates an example in which the engaging portion 22 is formed of a hard plastic, the engaging portion 22 may be formed of a soft material. By doing so, the cassette 10 can be rounded easily when the cassette 10 is rounded such that the longitudinal direction of the cassette 10 becomes the peripheral direction of the imaged subject at the time of radiographic imaging. Moreover, the cassette 10 can also be rounded such that the short-side direction of the cassette 10 becomes the peripheral direction of the imaged subject.

Figure 9A:
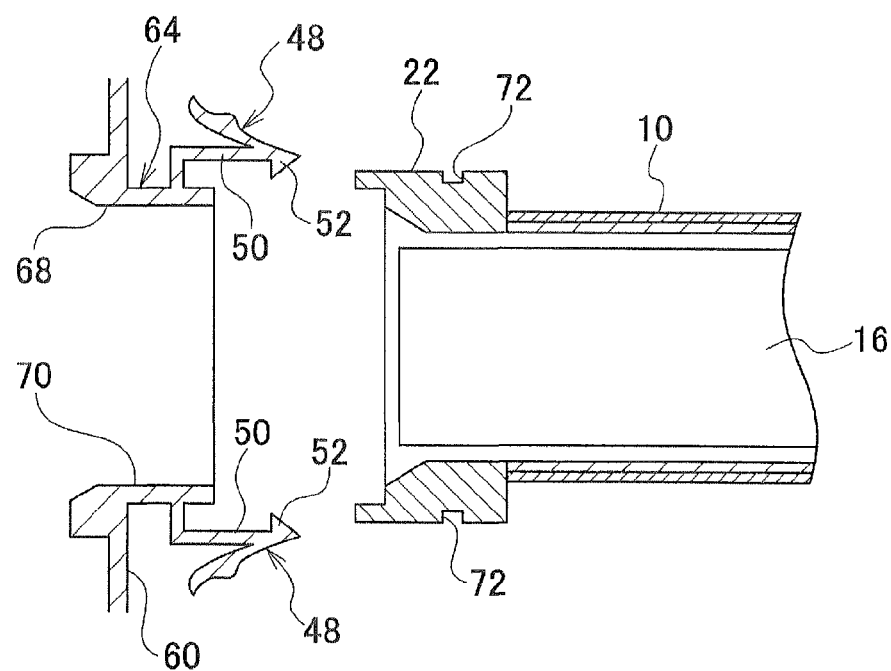
FIGS. 9A and 9B are plan sectional views showing a cassette mounting portion relating to a fourth exemplary embodiment of the present invention.
Figure 9B:
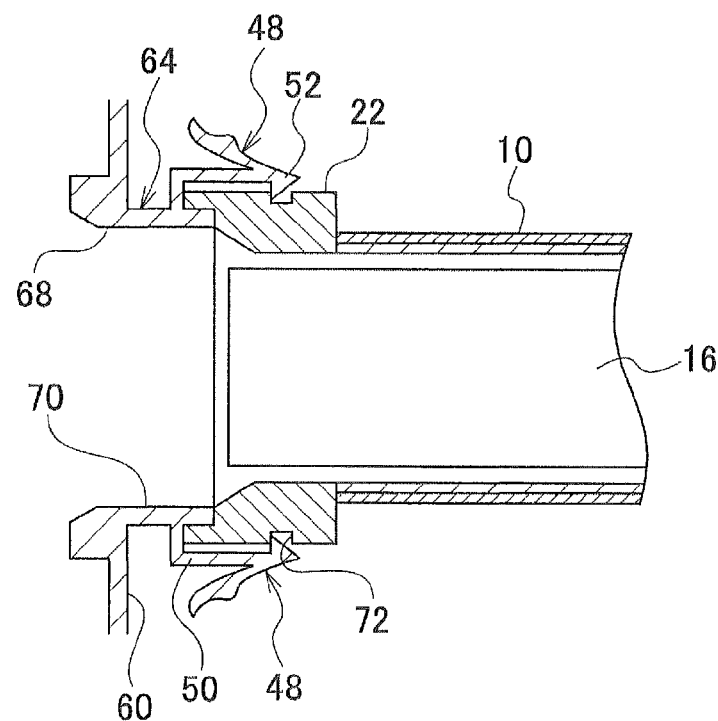

Further, as shown in FIG. 1, the first exemplary embodiment illustrates an example in which the claw portions 48 for engaging and holding are provided at the left and right side surfaces of the engaging portion 22. However, as in a fourth exemplary embodiment that is shown in the plan views of FIGS. 9A and 9B in which the vicinity of the cassette mounting portion 64 is enlarged, the claw portions 48 may be provided at the cassette mounting portion 64 side (in FIGS. 9A and 9B, at the engaged portion 70 of the cassette mounting portion 64). The state before the cassette 10 is mounted to the cassette mounting portion 64 is shown in FIG. 9A, and the state in which the cassette 10 is mounted to the cassette mounting portion 64 is shown in FIG. 9B. By doing so, the claw members 48 can be eliminated from the periphery of the engaging portion 22, and therefore, the cassette 10 can be made to be put into place easily when the cassette 10 is attached to an imaged subject at the time of radiographic imaging.

Moreover, as shown in FIG. 2, the first exemplary embodiment illustrates an example in which the sensitivity enhancing sheet 36 is accommodated in the accommodating portion chamber 26, and the lead sheet 38 is accommodated in the accommodating portion chamber 30. However, other sheets for improving the quality of the radiographic images formed at the fluorescent layer of the accumulative fluorescent sheet 16 during radiographic imaging may be accommodated in the accommodating portion chambers 26, 30. Further, when not necessary, sheets such as the sensitivity enhancing sheet or the lead sheet or the like do not have to be accommodated in either of or in both of the accommodating portion chambers 26, 30, and the cassette 10 may be made to be a structure that does not have sheets (the accommodating portion chambers 26, 30) such as the sensitivity enhancing sheet or the lead sheet or the like.

For example, if a lead sheet that is a filter for conversion is accommodated in the accommodating portion chamber 26, at the time of radiographic imaging, radiation of the needed strength and radiation type can be irradiated through this lead sheet onto the accumulative fluorescent sheet 16.

Figure 10A:
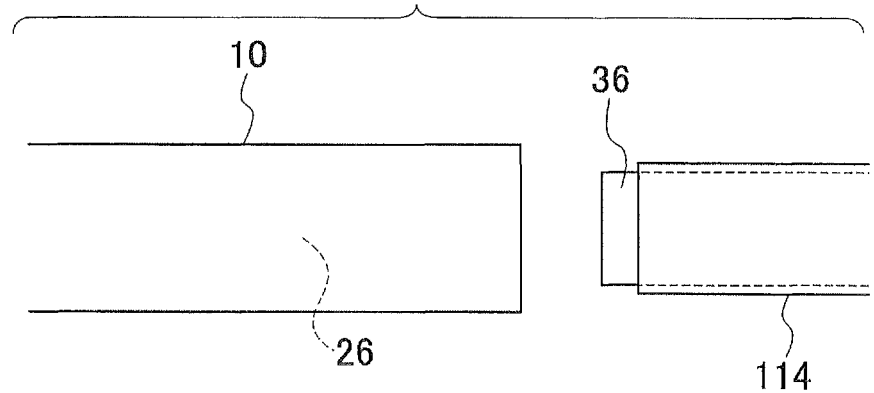
FIGS. 10A through 10E are side views showing an insertion tool relating to a fifth exemplary embodiment of the present invention.

Further, as shown in FIG. 2, the first exemplary embodiment illustrates an example in which the sensitivity enhancing sheet 36, such as lead foil or the like, is accommodated in the accommodating portion chamber 26. However, in a case in which a thin sheet material such as lead foil or the like is accommodated in the accommodating portion chamber 26, 30, for example, in a method such as the fifth exemplary embodiment that is illustrated in FIGS. 10A through 10E, the thin sheet material may be inserted into the accommodating portion chamber 26, 30 by using an insertion tool 114. First, as shown in FIG. 10A and the perspective view of FIG. 11, the sensitivity enhancing sheet 36 is nipped-in, such that the distal end portion thereof projects-out in the longitudinal direction, between the insertion tool 114 that is formed by folding a hard sheet material in two.

Figure 10B:
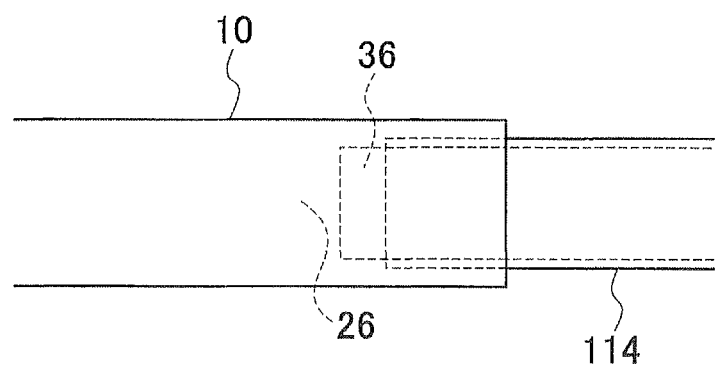
Figure 11:
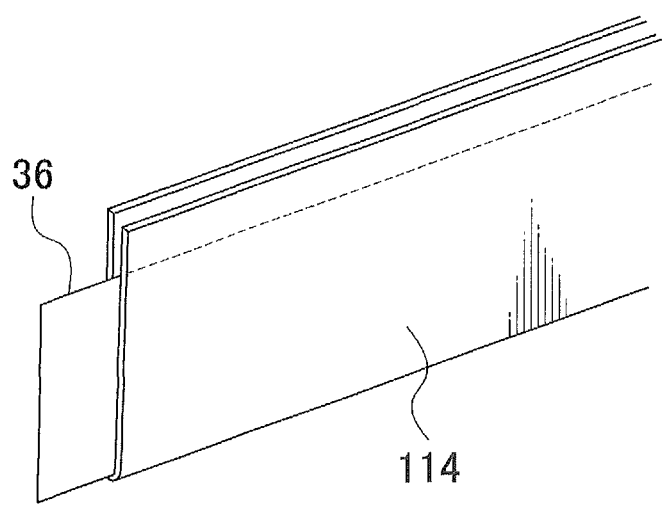
FIG. 11 is a perspective view showing the insertion tool relating to the fifth exemplary embodiment of the present invention.

Next, as shown in FIG. 10B, in the state in which the sensitivity enhancing sheet 36 is nipped and is held by the insertion tool 114 by being pressed or the like by the finger of a person or the like from the outer side of the insertion tool 114, a predetermined length of the insertion tool 114, together with the sensitivity enhancing sheet 36, is inserted in the accommodating portion chamber 26 of the cassette 10 and is stopped.

Figure 10C:
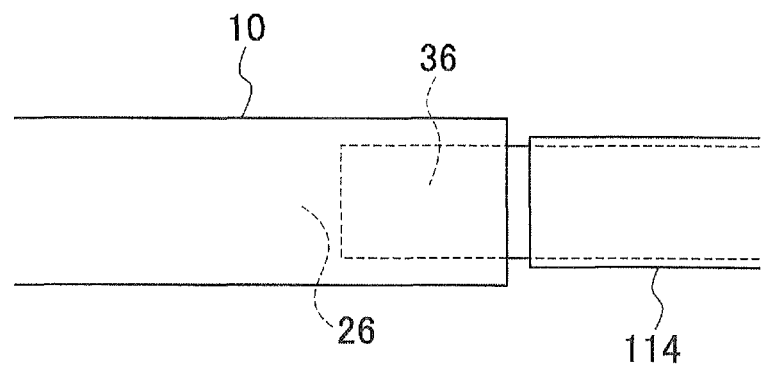

Next, as shown in FIG. 10C, in the state in which the distal end portion of the sensitivity enhancing sheet 36 is held in the accommodating portion chamber 26 by being pressed or the like by the finger of a person or the like from the outer side of the cassette 10, only the insertion tool 114 is pulled-out until it appears at the exterior of the cassette 10.

Figure 10D:
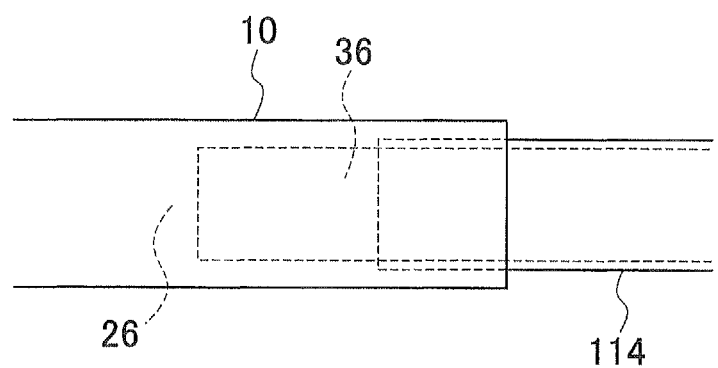

Next, as shown in FIG. 10D, in the state in which the sensitivity enhancing sheet 36 is nipped and is held by the insertion tool 114 by being pressed or the like by the finger of a person or the like from the outer side of the insertion tool 114, a predetermined length of the insertion tool 114, together with the sensitivity enhancing sheet 36, is inserted in the accommodating portion chamber 26 of the cassette 10 and is stopped.

Figure 10E:
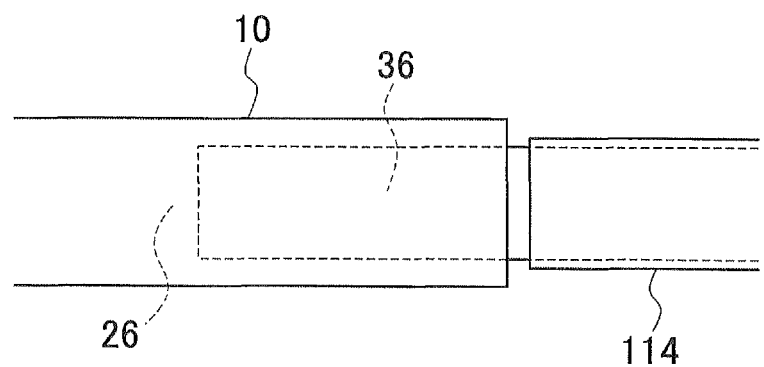

Next, as shown in FIG. 10E, in the state in which the distal end portion of the sensitivity enhancing sheet 36 is held in the accommodating portion chamber 26 by being pressed or the like by the finger of a person or the like from the outer side of the cassette 10, only the insertion tool 114 is pulled-out until it appears at the exterior of the cassette 10.

Thereafter, by repeating the operations of FIGS. 10D and 10E, the sensitivity enhancing sheet 36 is entirely accommodated in the accommodating portion chamber 26.

Moreover, as shown in FIG. 2, the first exemplary embodiment illustrates an example in which the sensitivity enhancing sheet 36 is accommodated in the accommodating portion chamber 26, and the lead sheet 38 is accommodated in the accommodating portion chamber 30. However, as in a sixth exemplary embodiment that is illustrated in the side sectional view of FIG. 12, a pair of magnetic plates 116, 118 may be provided within the cassette 10 so as to nip therebetween the accumulative fluorescent sheet 16 and the sensitivity enhancing sheet 36, and the accumulative fluorescent sheet 16 and the lead sheet 38.

Figure 12:
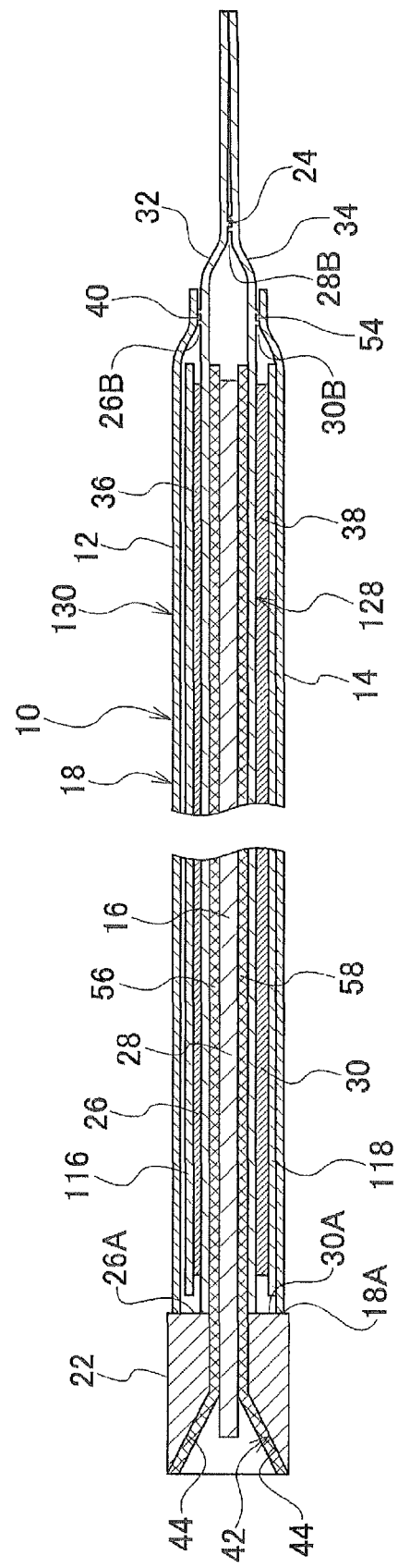
FIG. 12 is a side sectional view showing a cassette relating to a sixth exemplary embodiment of the present invention.

The magnetic plates 116, 118 protrude-out from the sensitivity enhancing sheet 36 and the lead sheet 38 in plan view (viewing the surface of the outer sheet 12, 14 from the outer portion side of the cassette 10 in FIG. 12), and are provided so as to cover the entire sensitivity enhancing sheet 36 and lead sheet 38. The sensitivity enhancing sheet 36 and the lead sheet 38 are urged toward the accumulative fluorescent sheet 16 side by the pair of magnetic plates 116, 118 that are drawn to one another by magnetic force. Due thereto, the sensitivity enhancing sheet 36 and the lead sheet 38 can be set close to or can be tightly fit to the accumulative fluorescent sheet 16, and, when carrying out radiographic imaging, the quality of the radiographic images formed at the fluorescent layer of the accumulative fluorescent sheet 16 can be improved.

Further, as shown in FIG. 6A, the first exemplary embodiment illustrates an example in which the light shielding fastener 24 of the cassette 10 is opened and the accumulative fluorescent sheet 16 is pushed-out toward the opening portion 42 of the engaging portion 22 by a push-out member. However, even when the light shielding fastener 24 is left in an opened state, the light shielded state of the interior of the cassette 10 (a state in which light, that is of an amount that eliminates the radiation energy accumulated at the accumulative fluorescent sheet 16 and is such that reading of the radiographic images cannot be carried out, is not illuminated onto the accumulative fluorescent sheet 16) can be ensured sufficiently, and further, the time over which the light shielding fastener 24 is open is short. Therefore, the work of mounting the cassette 10 to the cassette mounting portion 64 of the radiographic image reading device 20 does not have to be carried out in a dark room.

Figure 13:
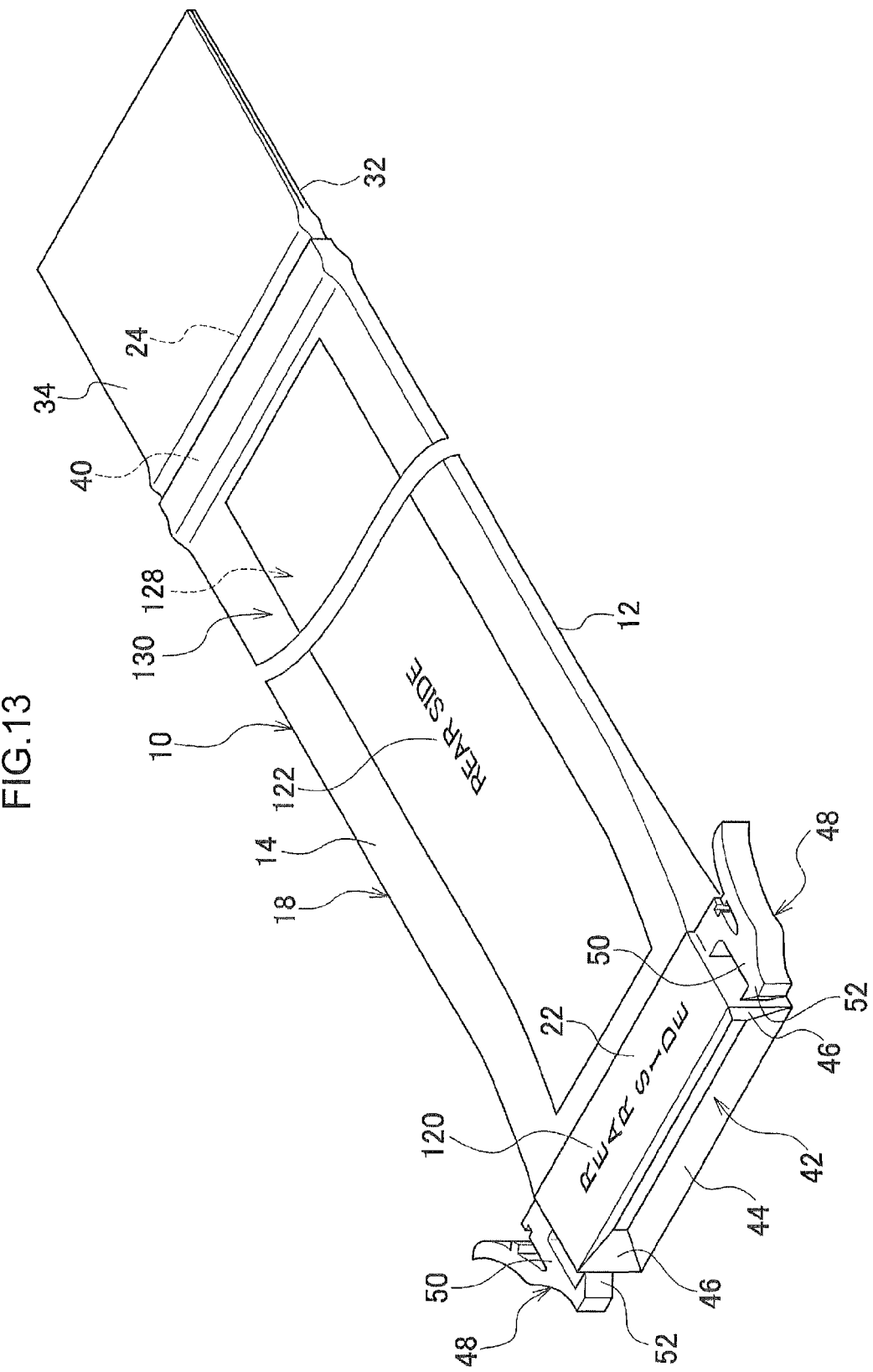
FIG. 13 is a perspective view showing a cassette relating to a seventh exemplary embodiment of the present invention.

Moreover, as shown in FIG. 4, the first exemplary embodiment illustrates an example in which the cassette 10 is placed on the supporting stand 66 so as to be oriented such that the fluorescent layer (the obverse) of the accumulative fluorescent sheet 16, on which radiographic image information of the imaged subject has been recorded by radiographic imaging, is the bottom surface. However, as in a seventh exemplary embodiment that is shown in the perspective view of FIG. 13, if identifying/indicating portions that identify the obverse and reverse surfaces of the flexible accommodating body 18 are provided at the engaging portion 22, the outer sheets 12, 14 or the inner sheets 32, 34 (FIG. 13 illustrates an example in which identifying/indicating portions 120, 122 that indicate that this is the reverse surface side of the flexible accommodating body 18 are provided at the engaging portion 22 and the outer sheet 14), the obverse and reverse surfaces of the flexible accommodating body 18 can be identified by the identifying/indicating portions 120, 122. Due thereto, the cassette 10 can be mounted to the radiographic image reading device 20 with the obverse and reverse surfaces of the flexible accommodating body 18 oriented in a predetermined way.

Figure 14:
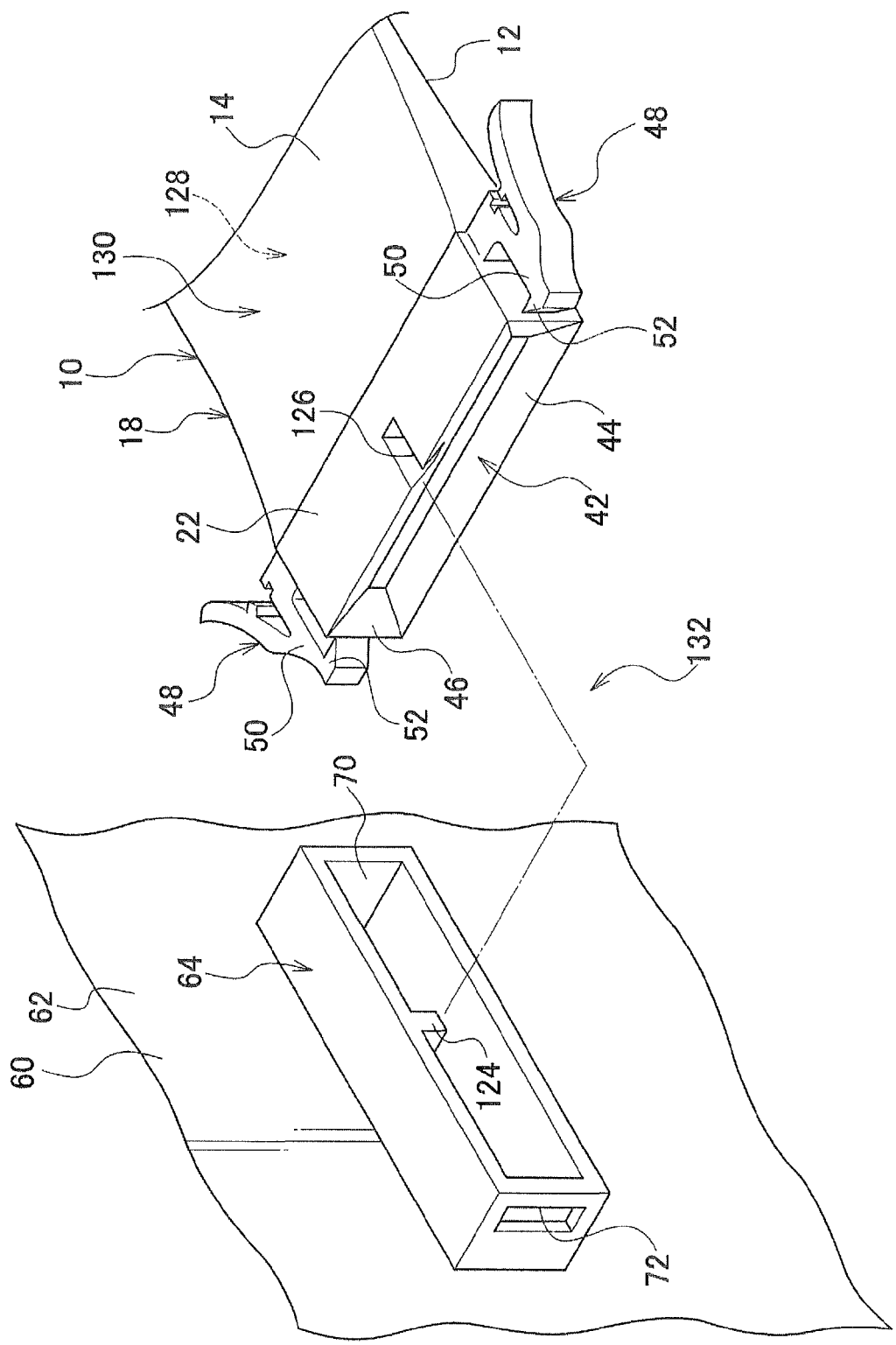
FIG. 14 is a perspective view showing an engaging portion relating to an eighth exemplary embodiment of the present invention.

Further, as in an eight exemplary embodiment that is shown in the perspective view of FIG. 14, the cassette 10 may be made able to be mounted to the cassette mounting portion 64 of the radiographic image reading device 20 when the obverse and reverse surfaces of the flexible accommodating body 18 are oriented in predetermined way. In FIG. 14, the engaging portion 22 is engaged with the engaged portion 70 when the obverse and reverse surfaces of the flexible accommodating body 18 are oriented in a predetermined way, by regulating means that is provided with a projecting portion 124, that is formed at the inner peripheral surface of the engaged portion 70, and a cut-out portion 126, that is formed in the outer peripheral surface of the engaging portion 22 and into which the projecting portion 124 is inserted. Due thereto, the cassette 10 can be mounted to the radiographic image reading device 20 with the obverse and reverse surfaces of the flexible accommodating body 18 oriented in a predetermined way. Therefore, if the accumulative fluorescent sheet 16 is accommodated in the flexible accommodating body 18 with the surfaces thereof oriented correctly with respect to the obverse and reverse surfaces of the flexible accommodating body 18, the accumulative fluorescent sheet 16 can be pushed-out by a push-out member from the cassette 10 into the radiographic image reading device 20 with the surfaces thereof oriented correctly.

In the above description, the cassette 10 that is an exemplary embodiment of the present invention is a structure that accommodates the accumulative fluorescent sheet 16 that is used in radiographic imaging. However, this cassette 10 is a technique that can be widely used in radiographic inspection that is carried out on machines, equipment, facilities and the like that are used in various industries such as airplanes, power generating facilities, petroleum facilities, and the like.

In the invention relating to the first aspect of the present invention, by opening the opening/closing means, a push-out member can be inserted in from the opened opening, and the accumulative fluorescent sheet can be pushed-out toward the entrance/exit portion. Namely, the accumulative fluorescent sheet can easily be taken-out to the exterior from the entrance/exit portion of the cassette.

In an invention relating to a second aspect, in the cassette relating to the first aspect, the opening/closing means is provided at another end portion of the flexible accommodating body.

In the invention relating to the second aspect, the opening/closing means is provided at the other end portion of the flexible accommodating body that is positioned at the side opposite the entrance/exit portion. Therefore, the accumulative fluorescent sheet can be pushed-out straight toward the entrance/exit portion by a push-out member that is inserted in from the opened opening.

In an invention relating to a third aspect, in the cassette relating to the first or second aspect, the opening/closing means is structured by a fastener having a groove portion and a projection portion that engages with the groove portion.

In the invention relating to the third aspect, by structuring the opening/closing means by a fastener having a groove portion and a projecting portion that engages with the groove portion, the flexible accommodating body can be reliably closed.

In an invention relating to a fourth aspect, in the cassette relating to any of the first through third aspects, tapered surfaces that widen toward an outer side are formed at an opening portion of the entrance/exit portion.

In the invention relating to the fourth aspect, the accumulative fluorescent sheet can be easily inserted into the entrance/exit portion from the exterior of the flexible accommodating body.

In an invention relating to a fifth aspect, the cassette relating to any of the first through fourth aspects has regulating means for making it possible to mount the entrance/exit portion to the radiographic image reading device when obverse and reverse surfaces of the flexible accommodating body are oriented in a predetermined way.

In the invention relating to the fifth aspect, the obverse and the reverse surfaces of the flexible accommodating body are oriented in a predetermined way, and the cassette can be mounted to the radiographic image reading device. Therefore, if the accumulative fluorescent sheet is accommodated such that the surfaces thereof are oriented in the correct way with respect to the obverse and reverse surfaces of the flexible accommodating body, the accumulative fluorescent sheet can be pushed-out by a push-out member from the cassette toward the radiographic image reading device with the surfaces oriented in the correct way.

In an invention relating to a sixth aspect, in the cassette relating to any of the first through fifth aspects, an identifying/indicating portion that identifies an obverse surface or a reverse surface of the flexible accommodating body is provided.

In the invention relating to the sixth aspect, the obverse and reverse surfaces of the flexible accommodating body can be identified by the identifying/indicating portion. Due thereto, the cassette can be mounted to the radiographic image reading device with the obverse and reverse surfaces of the flexible accommodating body being oriented in a predetermined way.

In an invention relating to a seventh aspect, in the cassette relating to any of the first through sixth aspects, a lead sheet is provided so as to face an obverse surface or a reverse surface of the accumulative fluorescent sheet that is accommodated in the flexible accommodating body.

In the invention relating to the seventh aspect, owing to the lead sheet that is provided at the flexible accommodating body, the quality of the radiographic images, that are formed on the accumulative fluorescent sheet when radiographic imaging is carried out, can be improved.

In an invention relating to an eighth aspect, the cassette relating to the seventh aspect has a pair of magnetic plates that are disposed between the accumulative fluorescent sheet and the lead sheet, and that urge the lead sheet toward the accumulative fluorescent sheet by being attracted to one another by magnetic force.

In the invention relating to the eighth aspect, the lead sheet can be set close to or can be fit tightly to the accumulative fluorescent sheet by the pair of magnetic plates that are drawn to one another by magnetic force. Due thereto, the quality of the radiographic images, that are formed on the accumulative fluorescent sheet when radiographic imaging is carried out, can be improved.

In an invention relating to a ninth aspect, in the cassette relating to the seventh or eighth aspect, the lead sheet has a plastic sheet and a lead layer that is formed on a top surface of the plastic sheet.

In the invention relating to the ninth aspect, because the lead layer is formed on the plastic sheet, it is difficult for wrinkles to form in the lead layer when the lead sheet is bent. Due thereto, the effect of improving the quality of the radiographic images due to the lead sheet can be exhibited uniformly over the entire surface of the lead sheet.

Because the present invention is structured as described above, it is easy to take an accumulative fluorescent sheet out to the exterior from an entrance/exit portion of a cassette.

Although exemplary embodiments of the present invention have been described above, the present invention is not limited in any way to these exemplary embodiments, and can, of course, be implemented in various forms within a scope that does not deviate from the gist of the present invention.

What is claimed is:

1. A cassette comprising:
   a flexible accommodating body that accommodates an accumulative fluorescent sheet in a light shielded state;
   an entrance/exit portion that is provided at one end portion of the flexible accommodating body, and through which the accumulative fluorescent sheet can be inserted and removed into and from the flexible accommodating body due to mounting to a radiographic image reading device; and
   an opening/closing portion that is configured to be operable to open the flexible accommodating body such that a push-out member, that pushes the accumulative fluorescent sheet out toward the entrance/exit portion, can be inserted, and that is configured to be operable to close the flexible accommodating body in a light shielded state.

2. The cassette of claim 1, wherein the opening/closing portion is provided at another end portion of the flexible accommodating body.

3. The cassette of claim 1, wherein the opening/closing portion is structured by a fastener having a groove portion and a projection portion that engages with the groove portion.

4. The cassette of claim 2, wherein the opening/closing portion is structured by a fastener having a groove portion and a projection portion that engages with the groove portion.

5. The cassette of claim 1, wherein the entrance/exit portion comprises an opening portion that communicates an inner side with an outer side of the flexible accommodating body, and
   wherein tapered surfaces that widen the opening portion toward an outer side of the flexible accommodating body are formed at a periphery of the opening portion.

6. The cassette of claim 2, wherein the entrance/exit portion comprises an opening portion that communicates an inner side with an outer side of the flexible accommodating body, and
   wherein tapered surfaces that widen the opening portion toward an outer side of the flexible accommodating body are formed at a periphery of the opening portion.

7. The cassette of claim 3, wherein the entrance/exit portion comprises an opening portion that communicates an inner side with an outer side of the flexible accommodating body, and
   wherein tapered surfaces that widen the opening portion toward an outer side of the flexible accommodating body are formed at a periphery of the opening portion.

8. The cassette of claim 1 comprising regulating portion for making it possible to mount the entrance/exit portion to the radiographic image reading device when obverse and reverse surfaces of the flexible accommodating body are oriented in a predetermined way.

9. The cassette of claim 2 comprising regulating portion for making it possible to mount the entrance/exit portion to the radiographic image reading device when obverse and reverse surfaces of the flexible accommodating body are oriented in a predetermined way.

10. The cassette of claim 3 comprising regulating portion for making it possible to mount the entrance/exit portion to the radiographic image reading device when obverse and reverse surfaces of the flexible accommodating body are oriented in a predetermined way.

11. The cassette of claim 1, wherein an identifying/indicating portion that identifies an obverse surface or a reverse surface of the flexible accommodating body is provided.

12. The cassette of claim 2, wherein an identifying/indicating portion that identifies an obverse surface or a reverse surface of the flexible accommodating body is provided.

13. The cassette of claim 3, wherein an identifying/indicating portion that identifies an obverse surface or a reverse surface of the flexible accommodating body is provided.

14. The cassette of claim 1, wherein a lead sheet is provided so as to face an obverse surface or a reverse surface of the accumulative fluorescent sheet that is accommodated in the flexible accommodating body.

15. The cassette of claim 2, wherein a lead sheet is provided so as to face an obverse surface or a reverse surface of the accumulative fluorescent sheet that is accommodated in the flexible accommodating body.

16. The cassette of claim 3, wherein a lead sheet is provided so as to face an obverse surface or a reverse surface of the accumulative fluorescent sheet that is accommodated in the flexible accommodating body.

17. The cassette of claim 14, further comprising a pair of magnetic plates,
wherein the accumulative fluorescent sheet and the lead sheet are disposed between the pair of magnetic plates, and
wherein the pair of magnetic plates urge the lead sheet toward the accumulative fluorescent sheet by being attracted to one another by magnetic force.

18. The cassette of claim 15, further comprising a pair of magnetic plates,
wherein the accumulative fluorescent sheet and the lead sheet are disposed between the pair of magnetic plates, and
wherein the pair of magnetic plates urge the lead sheet toward the accumulative fluorescent sheet by being attracted to one another by magnetic force.

19. The cassette of claim 14, wherein the lead sheet has a plastic sheet and a lead layer that is formed on a top surface of the plastic sheet.

20. The cassette of claim 17, wherein the lead sheet has a plastic sheet and a lead layer that is formed on a top surface of the plastic sheet.

* * * * *